United States Patent
Chamberlain

(10) Patent No.: US 9,860,938 B2
(45) Date of Patent: Jan. 2, 2018

(54) POWER CABLING CONNECTIONS FOR REMOTE RADIO HEADS AND RELATED METHODS

(71) Applicant: CommScope Technologies LLC, Hickory, NC (US)

(72) Inventor: John C. Chamberlain, Hickory, NC (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 15/273,902

(22) Filed: Sep. 23, 2016

(65) Prior Publication Data

US 2017/0094718 A1    Mar. 30, 2017

Related U.S. Application Data

(60) Provisional application No. 62/234,733, filed on Sep. 30, 2015.

(51) Int. Cl.
| | |
|---|---|
| *H04M 1/00* | (2006.01) |
| *H04W 88/08* | (2009.01) |
| *H04M 19/00* | (2006.01) |

(52) U.S. Cl.
CPC ....... *H04W 88/085* (2013.01); *H04M 19/005* (2013.01)

(58) Field of Classification Search
CPC .......................... H04W 88/085; H04M 19/005
USPC ................... 455/572, 127.1, 298, 343.6, 522
See application file for complete search history.

(56) References Cited

U.S. PATENT DOCUMENTS

| | | | |
|---|---|---|---|
| 8,810,990 B1 | 8/2014 | Miller et al. | |
| 2012/0069880 A1* | 3/2012 | Lemson | H04B 1/18 |
| | | | 375/220 |
| 2012/0155446 A1* | 6/2012 | Machida | H04W 52/0232 |
| | | | 370/338 |
| 2012/0224541 A1 | 9/2012 | Yoshiuchi et al. | |
| 2013/0128810 A1* | 5/2013 | Lee | H04W 84/042 |
| | | | 370/328 |
| 2014/0064394 A1* | 3/2014 | Wang | H04B 7/0456 |
| | | | 375/267 |
| 2014/0219174 A1 | 8/2014 | Wang et al. | |
| 2014/0355941 A1 | 12/2014 | Burris et al. | |
| 2015/0080055 A1 | 3/2015 | Smentek et al. | |
| 2015/0168974 A1* | 6/2015 | Mascarenhas | H04L 12/10 |
| | | | 700/297 |
| 2015/0326317 A1 | 11/2015 | Michaelis et al. | |

OTHER PUBLICATIONS

Notification of Transmittal of the International Search Report and the Written Opinion of the International Searching Authority for corresponding PCT/US16/52834, dated Dec. 7, 2016 (12 pages).

* cited by examiner

*Primary Examiner* — Dominic Rego
(74) *Attorney, Agent, or Firm* — Myers Bigel, P.A.

(57) ABSTRACT

Power cabling connections for supplying power from a power supply to a plurality of remote radio heads include a trunk power cable having a trunk power supply conductor and a trunk return conductor that are enclosed within a cable jacket and electrically insulated from each other; and a plurality of remotely-controlled switches that are interposed between the trunk power cable and the respective remote radio heads that are configured to selectively electrically connect the trunk power supply conductor and the trunk return conductor to a respective one of the radio heads.

20 Claims, 8 Drawing Sheets

POWER CABLING CONNECTIONS FOR REMOTE RADIO HEADS AND RELATED METHODS

CROSS-REFERENCE TO RELATED APPLICATION

The present application claims priority under 35 U.S.C. §119 to U.S. Provisional Patent Application Ser. No. 62/234,733, filed Sep. 30, 2015, the entire content of which is incorporated herein by reference.

FIELD OF THE INVENTION

The present invention relates generally to remote radio heads, and more particularly to delivering power to remote radio heads at the top of antenna towers and/or in other locations that are remote from a power supply.

BACKGROUND

Cellular base stations typically include, among other things, a radio, a baseband unit, and one or more antennas. The radio receives digital information and control signals from the baseband unit and modulates this information into a radio frequency ("RF") signal that is then transmitted through the antennas. The radio also receives RF signals from the antenna and demodulates these signals and supplies them to the baseband unit. The baseband unit processes demodulated signals received from the radio into a format suitable for transmission over a backhaul communications system. The baseband unit also processes signals received from the backhaul communications system and supplies the processed signals to the radio. A power supply is provided that generates suitable direct current ("DC") power signals for powering the baseband unit and the radio. The radio is often powered by a (nominal) −48 Volt DC power supply.

In order to increase coverage and signal quality, the antennas in many cellular base stations are located at the top of a tower, which may be, for example, about fifty to two hundred feet tall. In early cellular systems, the power supply, baseband unit and radio were all located in an equipment enclosure at the bottom of the tower to provide easy access for maintenance, repair and/or later upgrades to the equipment. Coaxial cable(s) were routed from the equipment enclosure to the top of the tower that carried signal transmissions between the radio and the antennas. However, in recent years, a shift has occurred and the radio is now more typically located at the top of the antenna tower and referred to as a remote radio head. Using remote radio heads may significantly improve the quality of the cellular data signals that are transmitted and received by the cellular base station, as the use of remote radio heads may reduce signal transmission losses and noise. In particular, as the coaxial cable runs up the tower may be 100-200 feet or more, the signal loss that occurs in transmitting signals at cellular frequencies (e.g., 1.8 GHz, 3.0 GHz, etc.) over the coaxial cable may be significant. Because of this loss in signal power, the signal-to-noise ratio of the RF signals may be degraded in systems that locate the radio at the bottom of the tower as compared to cellular base stations where remote radio heads are located at the top of the tower next to the antennas (note that signal losses in the cabling connection between the baseband unit at the bottom of the tower and the remote radio head at the top of the tower may be much smaller, as these signals are transmitted at baseband frequencies or as optical signals on a fiber optic cable and then converted to RF frequencies at the top of the tower).

FIG. 1 schematically illustrates a conventional cellular base station 10 in which the radios are implemented as remote radio heads ("RRH"). As shown in FIG. 1, the cellular base station 10 includes an equipment enclosure 20 and a tower 30. The equipment enclosure 20 is typically located at the base of the tower 30, and a baseband unit 22 and a power supply 26 are located within the equipment enclosure 20. The baseband unit 22 may be in communication with a backhaul communications system 28. A plurality of remote radio heads 24 and a plurality of antennas 32 (e.g., three sectorized antennas 32) are located at the top of the tower 30. While the use of tower-mounted remote radio heads 24 may improve signal quality, it also requires that DC power be delivered to the top of the tower 30 to power the remote radio heads 24.

A fiber optic cable 38 connects the baseband unit 22 to the remote radio heads 24, as fiber optic links may provide greater bandwidth and lower loss transmissions as compared to coaxial cables. A trunk power cable 36 is also provided for delivering the DC power signal up the tower 30 to the remote radio heads 24. The trunk power cable 36 may comprise a plurality of pairs of insulated power supply conductors and insulated return conductors, with each pair supplying power to a respective one of the remote radio heads 24. The fiber optic cable 38 and the trunk power cable 36 may be provided together in a hybrid power/fiber optic trunk cable 40. The trunk cable 40 may include a breakout enclosure 42 at one end thereof (the end at the top of the tower 30). Individual optical fibers from the fiber optic cable 38 and individual pairs of conductors of the trunk power cable 36 are separated out in the breakout enclosure 42 and connected to the remote radio heads 24 via respective breakout cords 44 (which may or may not be integral with the trunk cable 40) that run between the remote radio heads 24 and the breakout enclosure 42. Stand-alone breakout cords 44 are typically referred to as "jumper cables." Coaxial cables 46 are used to connect each remote radio head 24 to a respective one of the antennas 32.

The DC voltage of a power signal that is supplied to a remote radio head 24 from the power supply 26 over a power cable 36 and breakout cord 44 may be determined as follows:

$$V_{RRH} = V_{PS} - V_{Drop} \qquad (1)$$

where $V_{RRH}$ is the DC voltage of the power signal that is delivered to the remote radio head 24, $V_{PS}$ is the DC voltage of the power signal that is output by the power supply 26, and $V_{Drop}$ is the decrease in the DC voltage that occurs as the DC power signal traverses the power cabling connection between the power supply 26 to the remote radio head 24, which comprises the trunk power cable 36 and breakout cord 44. $V_{Drop}$ may be determined according to Ohm's Law as follows:

$$V_{Drop} = I_{RRH} * R_{Cable} \qquad (2)$$

where $R_{Cable}$ is the cumulative electrical resistance (in Ohms) along the power supply and the return conductors of the trunk power cable 36 and breakout cord 44 that connect the power supply 26 to the remote radio head 24, and $I_{RHH}$ is the average current (in Amperes) flowing through the trunk power cable 36 and breakout cord 44 to the remote radio head 24. As is readily apparent from Equation (2), the voltage drop $V_{Drop}$ along the trunk power cable 36 increases linearly with the cumulative electrical resistance of the trunk power cable 36. The voltage drop $V_{Drop}$ of Equation (2) is also referred to herein as the I*R voltage drop.

The DC power supply signal will experience a power loss as it is carried over the power cabling connection from the power supply 26 to the remote radio head 24. The power loss may be calculated as the product of the voltage drop $V_{Drop}$ and the power supply current $I_{RRH}$. In other words:

$$P_{Loss}=V_{Drop}*I_{RRH}=(I_{RRH}*R_{Cable})*I_{RRH}=I_{RRH}^2*R_{Cable} \qquad (3)$$

As shown in Equation (3), the power loss varies linearly with the resistance $R_{Cable}$ of the power cabling connection. The power loss $P_{Loss}$ is referred to herein as the $I^2*R$ power loss. By decreasing the resistance of the trunk power cable 36, the $I^2*R$ power loss, and hence the cost of operating a cellular base station may be reduced. As a typical remote radio head 24 may require about a kilowatt of power and may run 24 hours a day, seven days a week, and as a large number of remote radio heads 24 may be provided at each cellular base station (e.g., three to twelve), the power savings may be significant.

The trunk power cables 36 and breakout cords 44 employed in cellular base stations typically use copper power supply and return conductors (or alloys thereof) that have physical properties which are familiar to those skilled in the art. One important property of these conductors is their electrical resistance. Copper resistance is specified in terms of unit length, typically milliohms (mΩ)/ft; as such, the cumulative electrical resistance $R_{Cable}$ of the trunk power cable 36 and the breakout cord 44 increases with the lengths thereof. Typically, the breakout cords 44 are much shorter than the power cable 36, and hence the trunk power cable 36 is the primary contributor to the cumulative resistance. Thus, the longer the trunk power cable 36, the higher the voltage drop $V_{Drop}$. This effect is well understand and is typically accounted for by engineering and the system architects.

The electrical resistance of a conductor of the trunk power cable 36 (or breakout cord 44) is inversely proportional to the diameter of the conductor (assuming a conductor having a circular cross-section). Thus, the larger the diameter of the conductors (i.e., the lower the gauge of the conductor) of the trunk power cable 36, the lower the resistance thereof. Accordingly, one way of reducing voltage drop is to use larger diameter power supply and return conductors in the trunk power cable 36, as such conductors will exhibit reduced resistance. However, such an approach increases the cost of the trunk power cable 36 and the weight loading on the antenna tower, both of which are undesirable.

SUMMARY

Pursuant to embodiments of the present invention, power cabling connections are provided for supplying power from a power supply to a plurality of remote radio heads. These power cabling connections may include a trunk power cable having a trunk power supply conductor and a trunk return conductor that are enclosed within a cable jacket and electrically insulated from each other; and a plurality of remotely-controlled switches that are interposed between the trunk power cable and the respective remote radio heads that are configured to selectively electrically connect the trunk power supply conductor and the trunk return conductor to a respective one of the radio heads.

In some embodiments, an end of the trunk power cable that is remote from the power supply may terminate into a breakout enclosure and the switches may be located within the breakout enclosure.

In some embodiments, the power cabling connection may further include a plurality of jumper cables, each of the jumper cables having a respective power supply conductor and a respective return conductor. The switches may be located in the respective power jumper cables.

In some embodiments, the switches may be included in respective inline devices that each include a pair of connectors.

In some embodiments, the power cabling connection may further include a switch controller that is configured to communicate with the switches via at least one of the trunk power supply conductor and the trunk return conductor.

In some embodiments, the switches may comprise frequency modulated switches that are controlled based on a frequency of a received control signal.

In some embodiments, the power cabling connection may further include a switch controller that is configured to communicate with the switches via a control cable that is separate from the trunk power supply conductor and the trunk return conductor. The control cable may, for example, be within the cable jacket of the composite power cable.

In some embodiments, the switches may be controlled via wireless control signals.

In some embodiments, the trunk power cable may terminate into a breakout enclosure that includes a plurality of connectorized pigtails.

In some embodiments, the switches may be electromechanical relays.

In some embodiments, the power cabling connection may be provided in combination with the power supply, the remote radio heads and at least one baseband unit that is in communication with the remote radio heads.

Pursuant to further embodiments of the present invention, methods of delivering power to a plurality of co-located remote radio heads are provided. Pursuant to these methods, a power supply signal may be delivered to the co-located remote radio heads using a composite trunk power cable that includes a single trunk power supply conductor and a single trunk return conductor and a plurality of jumper cables that electrically connect the single trunk power supply conductor and the single trunk return conductor to the respective remote radio heads. A switch that is interposed on the electrical path between the trunk power supply and return conductors of the composite trunk power cable and a first of the remote radio heads may be controlled to interrupt delivery of the power supply signal to the first of the remote radio heads.

In some embodiments, the composite trunk power cable may terminate into a breakout enclosure, and the switch is located within the breakout enclosure.

In some embodiments, the breakout enclosure may include an additional plurality of switches that are interposed between the trunk power supply and return conductors of the composite trunk power cable and the respective remote radio heads other than the first of the remote radio heads.

In some embodiments, the switch may be controlled via a control signal that is transmitted over the trunk power supply conductor or that is transmitted over a control cable.

In some embodiments, the switch may be incorporated into a jumper cable that is connected to the first remote radio head.

In some embodiments, the composite power supply may terminate into a breakout enclosure, and the switch may be incorporated into an inline device that is positioned between the breakout enclosure and the first remote radio head.

In some embodiments, the switch may be controlled via a wireless control signal transmitted from a switch controller that is remote from the remote radio heads.

DETAILED DESCRIPTION

Figure 1:
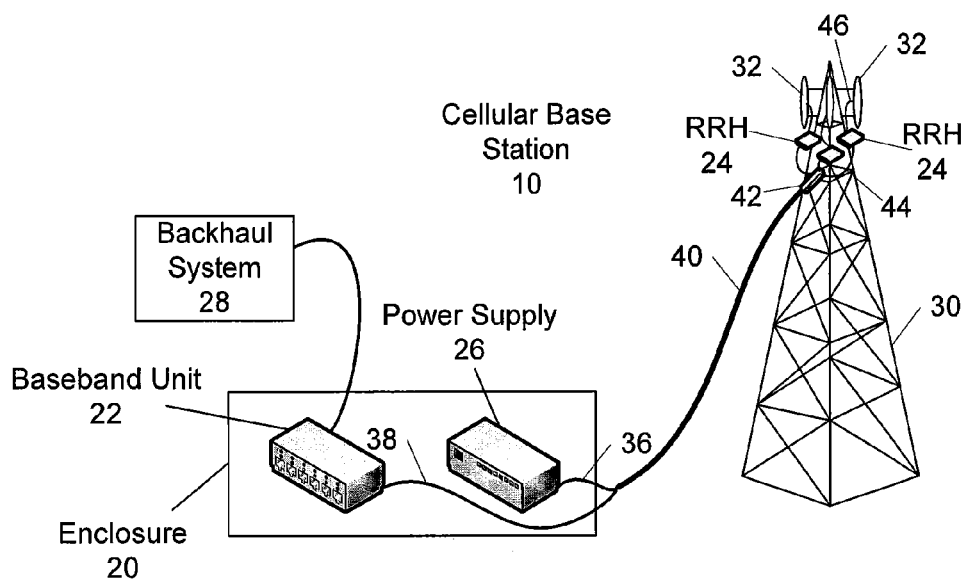
FIG. 1 is a simplified, schematic view of a conventional cellular base station in which several remote radio heads are located at the top of an antenna tower.

Pursuant to embodiments of the present invention, power cabling connections for powering a plurality of remote radio heads are provided that use a "composite" trunk power cable that has a single trunk power supply conductor and a single trunk return conductor. These composite trunk power cables may be used to replace conventional trunk power cables that include separate individual power cables for each remote radio head. As will be discussed in detail below, the composite trunk power cables according to embodiments of the present invention may be lighter and cheaper than conventional trunk power cables while providing enhanced performance.

Typically, the size of the power conductors that are included in a trunk power cable is selected to ensure that the voltage drop and/or power loss will not exceed pre-specified levels when any of the remote radio heads are operating under maximum load conditions. Consequently, when each remote radio head is powered by its own individual power cable, the conductors of the power cable must be sized to support the remote radio head operating under maximum load conditions. It is, however, highly unlikely that all of the remote radio heads at a cellular base station (which now typically include nine or twelve remote radio heads) will operate under maximum load conditions at the same time. Accordingly, the amount of copper included in the conductors of the composite trunk power cables according to embodiments of the present invention may be reduced as compared to the amount of copper used in an "equivalent" conventional trunk power cable without any anticipated loss in performance, since all of the remote radio heads share the same power conductors. Depending upon the expected traffic levels, it is anticipated that the amount of copper used in the composite trunk power cables according to embodiments of the present invention may be 10-50% less than the amount of copper included in an equivalent conventional trunk power cable. In other words, because the composite trunk power cables according to embodiments of the present invention allow sharing the loads of all of the remote radio heads over a single power cabling connection, the fact that most of the remote radio heads will be operating well below their maximum load at any given time allows for a reduction in the amount of copper included in the trunk power cable and/or an enhancement in the voltage drop and power loss performance of the cable.

In certain situations, it may be necessary to turn off one or more of a plurality of remote radio heads. Unfortunately, most remote radio heads are located in highly inaccessible locations such as at the tops of antenna towers, on water towers, atop buildings or in tunnels, making it difficult to access the remote radio heads to turn one off when necessary. Consequently, a remote radio head is typically shut off by simply disconnecting the power cable that supplies power to the remote radio head (or, equivalently, setting the power supply to not feed power to the remote radio head). Unfortunately, when a composite trunk power cable is deployed that has a single pair of power conductors that are used to power multiple remote radio heads, the ability to selectively turn off just a subset (e.g., one) of the remote radio heads from the base of the tower is lost.

The power cabling connections according to embodiments of the present invention address this deficiency by including remotely controlled power supply switches that allow the power to any individual remote radio head to be cut off from a remote location such as from the base of the tower. These power supply switches may be positioned in a variety of locations. For example, in some embodiments, the power supply switches may be located within a breakout enclosure that receives the trunk power supply and return conductors of the composite trunk power cable. The breakout enclosure is typically located at or near the top of the antenna tower or other mounting structure close to the remote radio heads. Electrical connections may be provided within the breakout enclosure that electrically connect the trunk power supply conductor and the trunk return conductor of the composite trunk power cable to a plurality of connectors that may be mounted, for example, in external walls of the breakout enclosure. Each connector may include a first contact that is electrically connected to the trunk power supply conductor of the composite trunk power cable and a second contact that is electrically connected to the trunk return conductor of the composite trunk power cable. Jumper cables may extend between each connector and a respective one of the remote radio heads to power the remote radio heads. In some embodiments, the power supply switches may be provided along the respective connections between the composite trunk power cable and the respective connectors.

In other embodiments, the power supply switches may be implemented in the jumper cables. For example, the power supply switches can be located in a connector of each jumper cable, or along a cable segment of the cable. In other embodiments, the power supply switches may be incorporated into an inline device that may be connected to, for example, a jumper cable. The power supply switches may also be provided in other locations.

The power supply switches may be controlled by wired or wireless connections. In some embodiments, each power supply switch may be programmed to respond to a different control signal or a set of control signals. The control signal(s) for each power supply switch may transition the switch between a "pass" state in which a power supply signal passes through the switch and a "block" state in which the power supply signal is not allowed to pass through the switch.

The above-described techniques may be used to improve the performance of cellular base stations that use remote radio heads that are mounted atop antenna towers. It will also be appreciated that cellular base stations exist where the remote radio heads and antennas are mounted in locations remote from the baseband equipment and power supply other than towers such as, for example, remote radio heads and antennas that are mounted on rooftops, atop utility poles, in subway tunnels and the like. It will be appreciated that the techniques described herein are equally applicable to these "non-tower" locations for the remote radio heads. Thus, while embodiments of the present invention are primarily described below with reference to tower-mounted remote radio heads, it will be appreciated that all of the embodiments described below may be implemented in cellular base stations that place the remote radio heads in other locations such as on rooftops, atop utility poles and in tunnels or other locations that are remote from the power supply and baseband equipment.

Embodiments of the present invention will now be discussed in more detail with reference to FIGS. 2-9, in which example embodiments of the present invention are shown.

Figure 2:
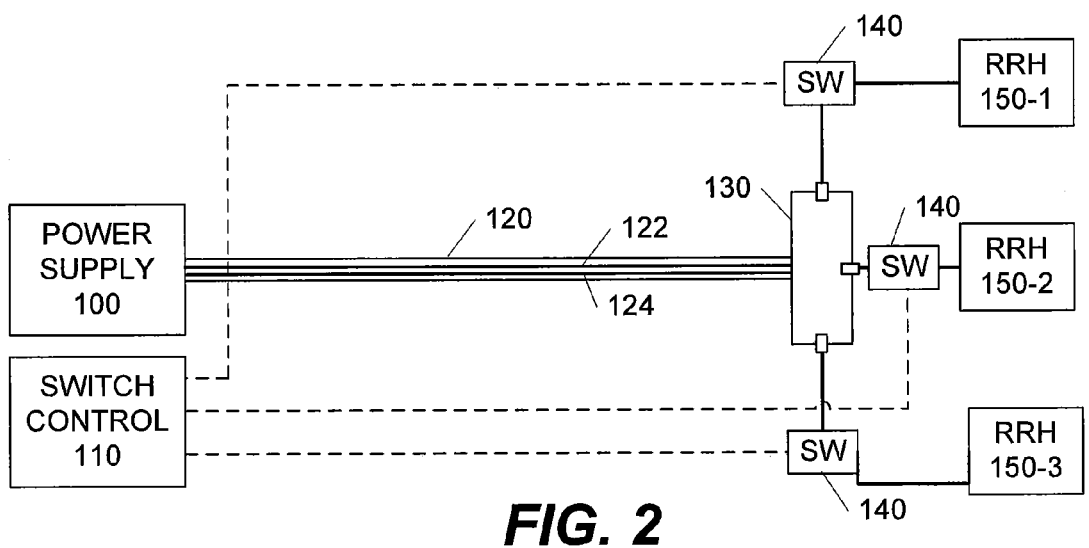
FIG. 2 is a schematic diagram illustrating an architecture for supplying power to a plurality of remote radio heads according to embodiments of the present invention.

FIG. 2 is a schematic diagram illustrating an architecture for supplying power to a plurality of remote radio heads according to embodiments of the present invention. As shown in FIG. 2, a plurality of remote radio heads 150-1 through 150-3 are electrically connected to a DC power supply 100 via a composite trunk power cable 120 that has a single trunk power supply conductor 122 and a single trunk return conductor 124. The composite trunk power cable 120 includes a breakout enclosure 130 on an end thereof that is adjacent the remote radio heads 150. The breakout enclosure 130 includes a plurality of power connectors that each are electrically connected to the trunk power supply and return conductors 122, 124 of the composite trunk power cable 120. Power supply switches 140 are interposed between the composite trunk power cable 120 and each of the remote radio heads 150.

A switch controller 110 may be located remotely from the power supply switches 140. The switch controller 110 may communicate with each power supply switch 140 over a wired or wireless connection. The communications connections between the switch controller 110 and the power supply switches 140 are shown with dotted lines in FIG. 2. The switch controller 110 may send control signals to each power supply switch 140 that control the power supply switches 140 to selectively either pass or block the power supply signal that is carried on the trunk power supply and return conductors 122, 124 from reaching the respective remote radio heads 150.

Figure 3:
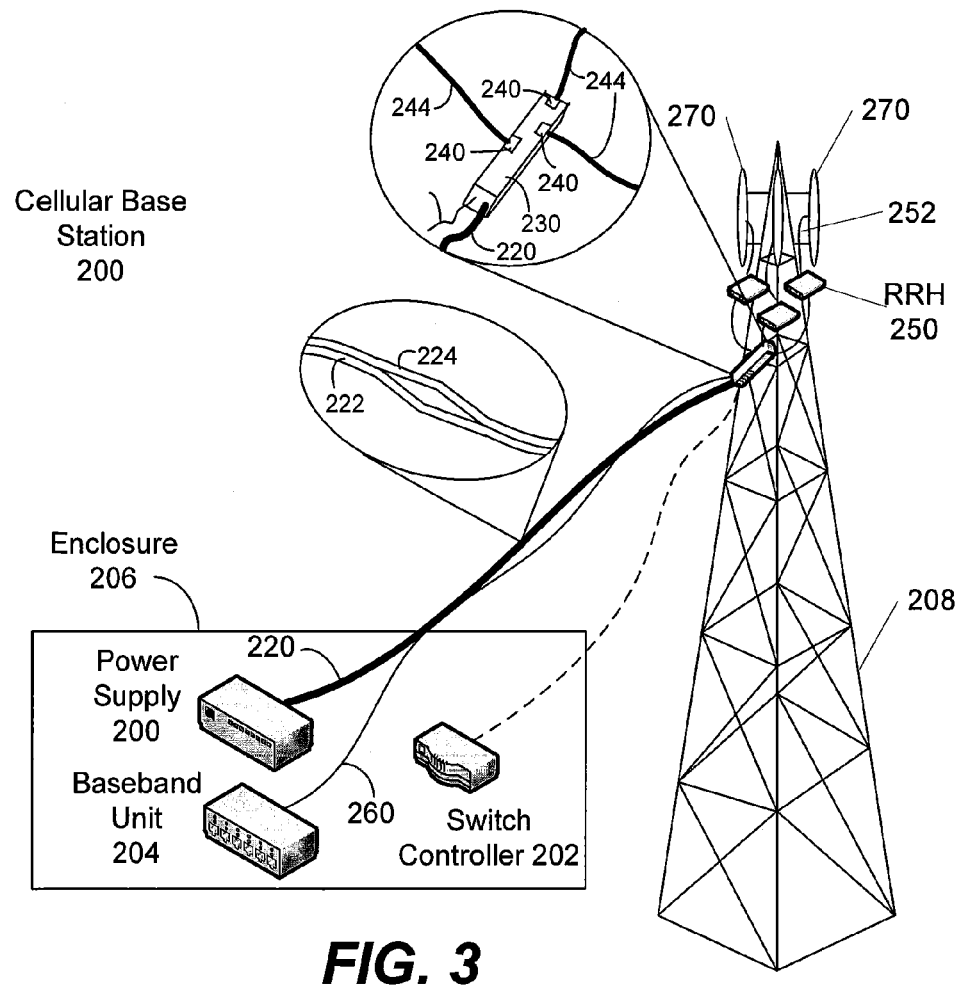
FIG. 3 is a schematic diagram illustrating a cellular base station according to embodiments of the present invention that uses a composite trunk power cable having a single trunk power supply conductor and a single trunk return conductor and associated remotely controlled power supply switches to power a plurality of remote radio heads.

FIG. 3 is a schematic diagram illustrating a cellular base station 200 according to embodiments of the present invention that uses a composite trunk power cable 220 and associated remotely controlled power supply switches 240 to power a plurality of remote radio heads 250.

As shown in FIG. 3, a power supply 200, a switch controller 202 and a baseband unit 204 may be located in an enclosure 206 at the base of an antenna tower 208. A composite trunk power cable 220 is connected to the power supply 200 and is routed from the enclosure 206 up the antenna tower 208. A fiber optic cable 260 is connected to the baseband unit 204 and is also routed from the enclosure 206 up the antenna tower 208. The composite trunk power cable 220 includes a single, large diameter trunk power supply conductor 222 and a single, large diameter trunk return conductor 224. The composite trunk power cable 220 has a breakout enclosure 230 at a first end thereof that is at the top of the antenna tower 208. A plurality of remote radio heads 250 are also mounted at the top of the tower 208, and each remote radio head 250 is connected to a respective antenna 270 by a respective coaxial cable 252. The breakout enclosure 230 includes a plurality of power connectors that each are electrically connected to the trunk power supply and return conductors 222, 224 of the composite trunk power cable 220. For example, the trunk power supply conductor 222 of the composite power cable 220 may be electrically connected to a power supply termination (not shown), and a plurality of individual power supply conductors (not shown) may be connected between the power supply termination and respective power connectors. The power connectors may, for example, be mounted in external walls of the breakout enclosure 230 or may be at the ends of pigtails that extend from the breakout enclosure 230. Likewise, the trunk return conductor 224 of the composite power cable 220 may be electrically connected to a return termination (not shown), and a plurality of individual return conductors (not shown) may be connected between the return termination and the respective power connectors. Remotely controlled power supply switches 240 are interposed between the composite power cable 220 and each of the remote radio heads 250. Example locations for these switches 240 will be discussed below with reference to FIGS. 5A-5E. In the example embodiment of FIG. 3, the power supply switches 240 are integrated into the breakout enclosure 230, and power jumper cables 244 extend between each power connector and a respective remote radio head 250.

While the composite trunk power cable 220 and the fiber optic cable 260 are illustrated as being separate cables in FIG. 3, it will be appreciated that in other embodiments these cables may be combined into a hybrid power/fiber optic trunk cable that includes a plurality of optical fibers as well as the composite trunk power supply and return conductors. Typically, such a hybrid trunk cable will include a pair of optical fibers for each remote radio head 250 that carry data between the respective remote radio heads 250 and the baseband unit 204. It should also be noted that FIG. 3 (as well as various of the other drawings) does not show the fiber optic connections between the breakout enclosure 230 and each remote radio head 250, in order to simplify the drawing and description. These fiber optic connections may be made using fiber optic connectors and jumper cables or by using hybrid jumper cables that include both a pair of power conductors and one or more optical fibers.

FIGS. 4A-4D are schematic diagrams that illustrate various methods of remotely controlling the power supply switches 140 of FIG. 2 or the power supply switches 240 of FIG. 3 according to embodiments of the present invention. In the description of these figures that follows, the element numbering of FIG. 2 is used (e.g., a composite trunk power cable 120). However, it will be appreciated that the elements in FIGS. 4A-4D could also be numbered as in FIG. 3 (e.g., a composite trunk power cable 220).

The power supply switches 140 are mounted in the breakout enclosure 130. The switch controller 110 controls each of the power supply switches 140 to either pass the power signal to its associated remote radio head 150 or to block the power signal from passing to the remote radio head 150. The control signals may be transmitted to the power supply switches in a variety of ways. FIGS. 4A-4D illustrate examples ways of transmitting the control signals to the power supply switches 140.

Figure 4A:
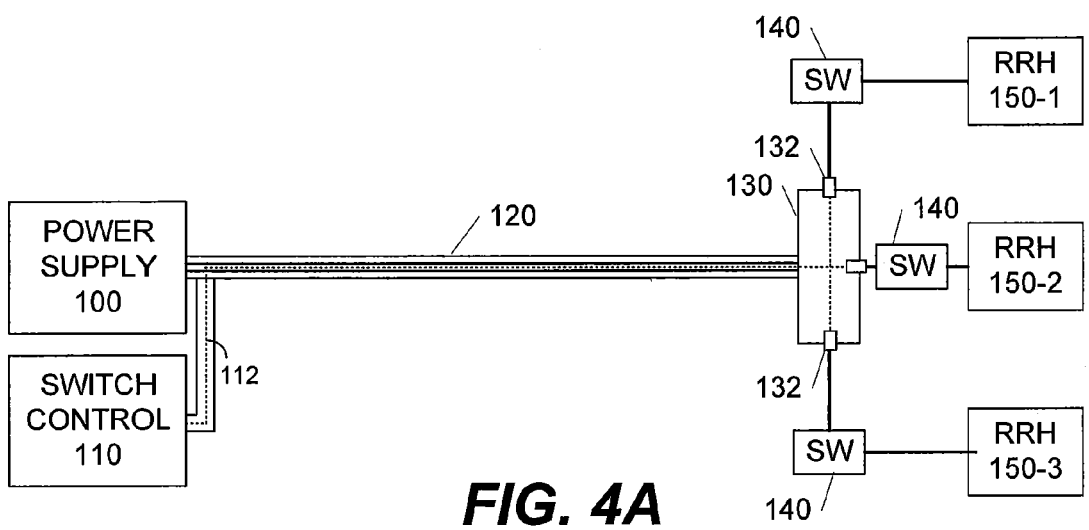
FIGS. 4A-4D are schematic diagrams that illustrate various methods of controlling power supply switches for remote radio heads from a remote location according to embodiments of the present invention.

As shown in FIG. 4A, in a first embodiment, the switch controller 110 transmits a switch control signal 112 onto the composite trunk power cable 120 where it is carried to respective connectors 132 of the breakout enclosure 130 along the trunk power supply conductor 122 and the electrical connections (not shown) in the breakout enclosure 130. The switch control signal 112 is then passed through the connectors 132 to the power supply switches 140. In this embodiment, each switch control signal 112 is transmitted to all of the power supply switches 140.

Figure 4B:
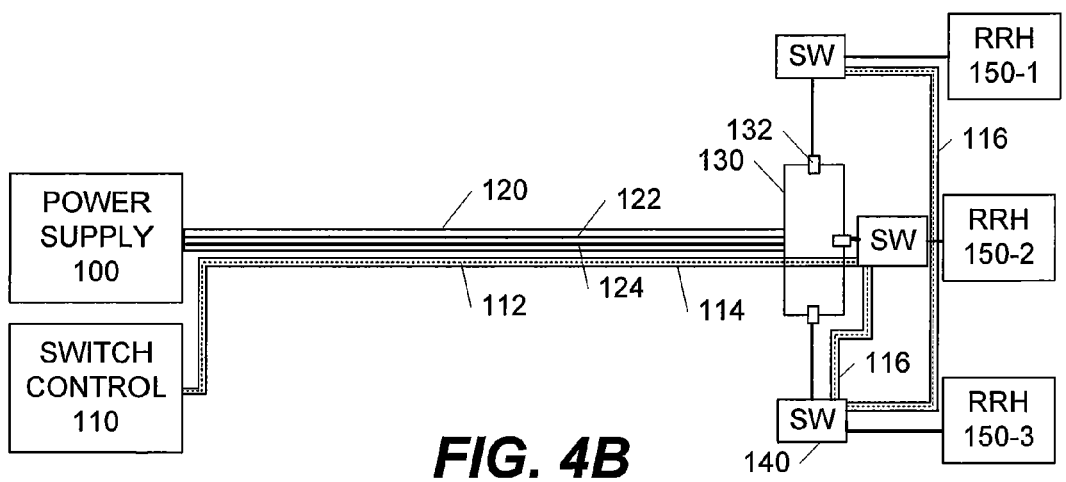

As shown in FIG. 4B, in another embodiment, the switch controller 110 transmits a switch control signal 112 onto a separate control cable 114 that extends from the switch controller 110 to the breakout enclosure 130 (and/or to a first of the power supply switches 140). In this embodiment, a series of additional control patch cords 116 extend between the power supply switches 140 so that the control signal 112 may be transmitted in series to all of the power supply switches 140. In this case, each power supply switch 140 may have a control signal input port as well as a control signal output port which allows the cables and cords 114, 116 to be connected between the power supply switches 140. In another embodiment (not shown) one end of the control cable 114 transitions into multiple patch cords that may be connected to each power supply switch 140, eliminating any need for a control signal output port on the power supply switches 140.

Figure 4C:
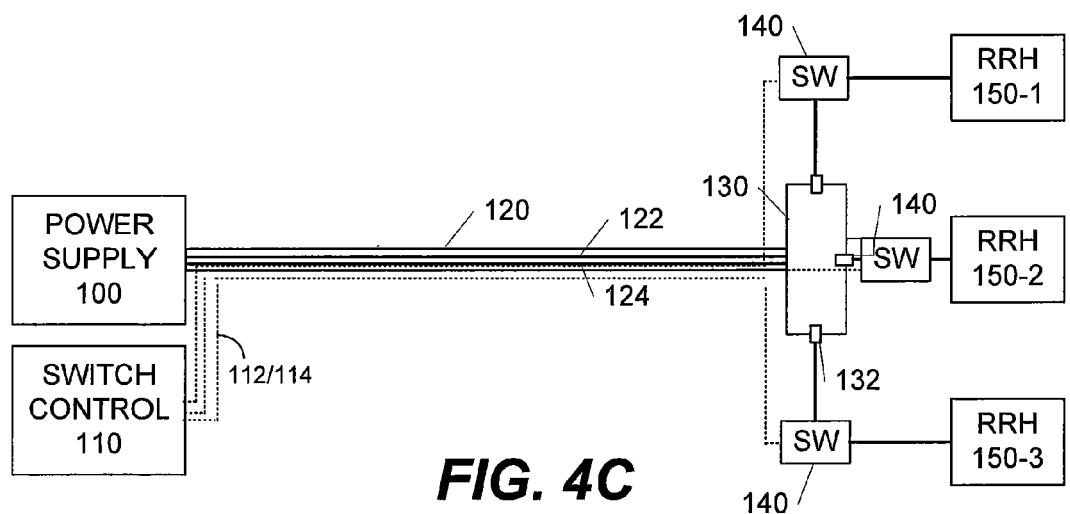

As shown in FIG. 4C, in another embodiment, a plurality of separate control cables 114 may be provided that extend from the switch controller 110 to the respective power supply switches 140. Control signals 112 may then be transmitted over each separate control cable 114 to control operation of the respective switches 140. In FIG. 4C, each control cable 114 and associated control signal 112 are illustrated together using a single dotted line to simplify the drawing. In this embodiment, the same control signals 112 may be used to control different power supply switches 140.

Figure 4D:
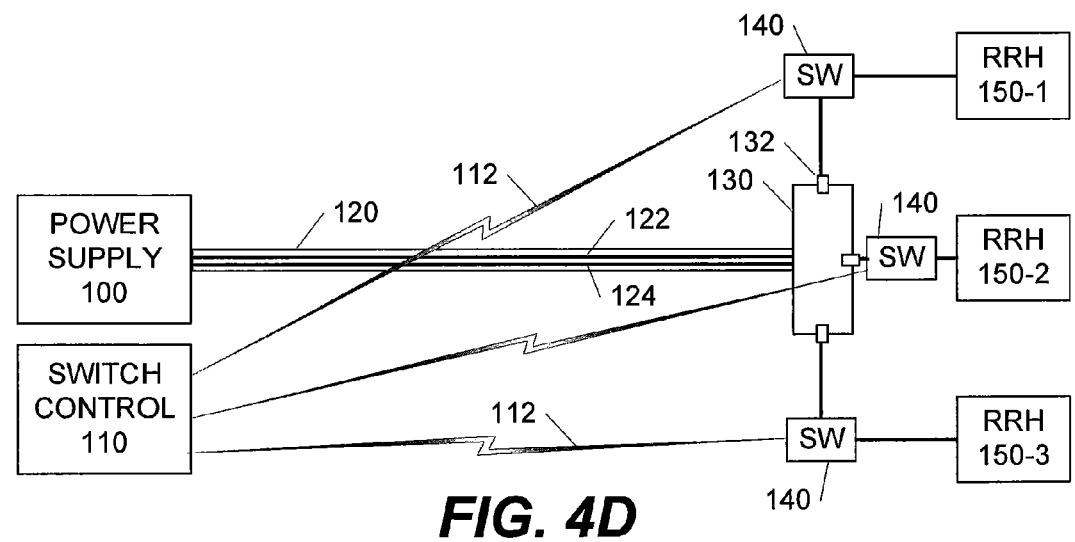

As shown in FIG. 4D, in yet another embodiment, the control signals 112 are transmitted wirelessly to the power supply switches 140 via an air interface.

FIGS. 5A-5E are schematic diagrams illustrating example locations where the remotely controlled power supply switches 140, 240 of FIGS. 2-4D may be deployed according to certain embodiments of the present invention. In the description of these figures that follows, the element numbering of FIGS. 2 and 4A-4D is used. However, it will be appreciated that the elements in FIGS. 5A-5E could also be numbered as in FIG. 3.

Figure 5A:
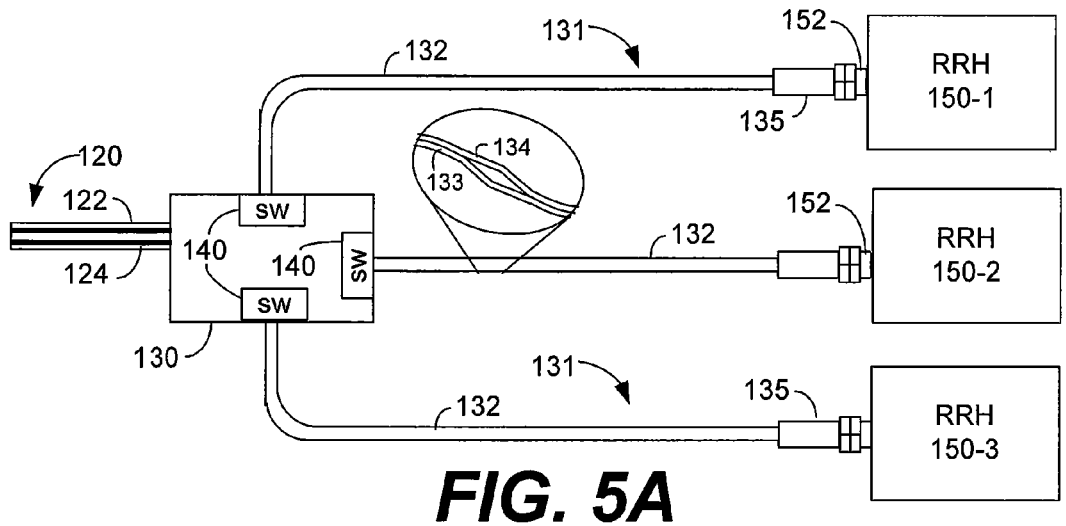
FIGS. 5A-5E are schematic diagrams illustrating example locations where the remotely controlled power supply switches of FIGS. 2-4D may be deployed according to embodiments of the present invention.

As shown in FIG. 5A, in some embodiments, the power supply switches 140 may be incorporated into the breakout enclosure 130. This may be a very convenient location for the power supply switches 140, as the breakout enclosure 130 is typically weatherized to protect the components therein from rain, moisture and other elements. In the embodiment shown in FIG. 5A, a plurality of connectorized pigtails 131 extend from the breakout enclosure 130. As shown in the inset in FIG. 5A, each pigtail 131 includes a jacketed cable segment 132 that has an individual power supply conductor 133 that is electrically connected to the trunk power supply conductor 122 of the composite trunk power cable 120 and an individual return conductor 134 that is electrically connected to the trunk return conductor 124 of the composite trunk power cable 12Q via electrical connectors (not shown) in the breakout enclosure 130. A power connector 135 is attached at the distal end of each cable segment 132 and has contacts that are electrically connected to the respective individual power supply and return conductors 133, 134. The power connectors 135 on the end of these pigtails 131 are connected to power connector ports 152 on the respective remote radio heads 150.

Figure 5B:
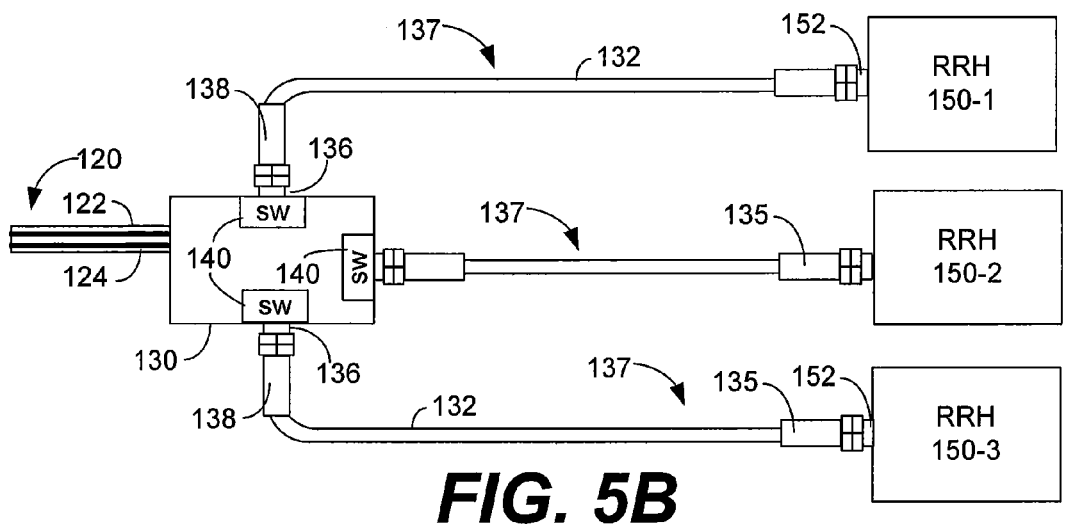

As shown in FIG. 5B, in a slightly different embodiment, the power supply switches 140 again are incorporated into the breakout enclosure 130 but, in this case, the pigtails 131 are replaced with power connector ports 136 that are installed in walls of the breakout enclosure 130. Each power connector port 136 includes a power supply contact that is electrically connected to the trunk power supply conductor 122 of the composite power cable 120 and a return contact that is electrically connected to the trunk return conductor 124 of the composite power cable 120 via electrical connectors (not shown) in the breakout enclosure 130. A plurality of power jumper cables 137 are used to electrically connect each power connector port 136 to a power connector port 152 on a respective one of the remote radio heads 150. Each jumper cable 137 includes a cable segment 132 and connectors 135, 138 on either end thereof.

Figure 5C:
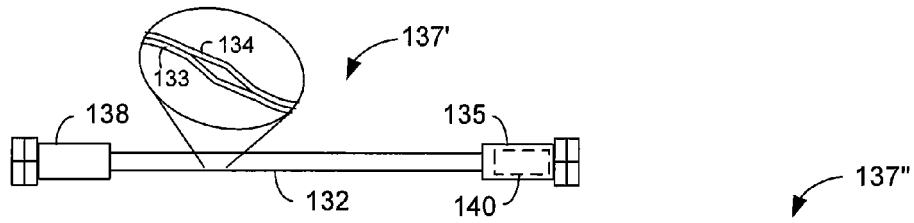
Figure 5D:
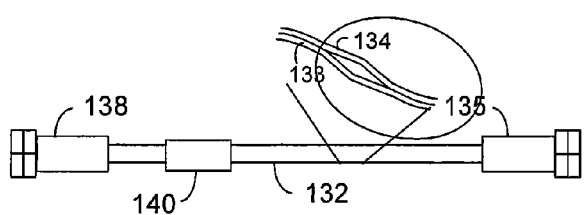
Figure 5E:
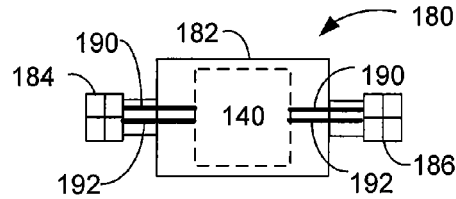

In other embodiments, the power supply switches 140 may be located external to the breakout enclosure 130. For example, the power supply switches 140 may be located in jumper cables that are used to carry the power signal between the breakout enclosure 130 and the remote radio heads 150, or may be incorporated into inline devices that may be connected to one end of each respective jumper cable. FIGS. 5C-5E illustrate several such example embodiments.

In particular, FIGS. 5C and 5D are schematic drawings illustrating jumper cables 137', 137" that have remotely controlled power supply switches 140 incorporated therein that may be used to selectively cut-off power to a remote radio head 150. The jumper cables 137', 137" of FIGS. 5C and 5D may, for example, extend from a breakout enclosure 130 at the top of the antenna tower (or other mounting structure) and the remote radio heads 150, similar to the jumper cables 137 shown in FIG. 5B (the breakout enclosures 130 and remote radio heads 150 are not illustrated in FIGS. 5C-5E in order to simplify the drawings). The jumper cables 137', 137" of FIGS. 5C-5D each include a cable segment 132, which may be identical to the cable segment 132 of the pigtail 131 described above. The cable segment 132 may include an individual power supply conductor 133 and an individual return conductor 134 that are electrically insulated from each other. The power supply conductor 133 and the return conductor 134 may each comprise, for example, an 8-gauge to a 14-gauge copper or copper alloy wire. The wire may be a solid wire or may be stranded. Stranded wires may be preferred in some embodiments as they may increase the flexibility of the jumper cables 137', 137". In some embodiments, two stranded 10-gauge wires may be stranded together to form the power supply and/or return conductors 133, 134. The use of two smaller wires that are stranded together to form the power supply and/or return conductor 133, 134 may further enhance the flexibility of the jumper cables 137', 137". A protective jacket may enclose the power supply and return conductors 133, 134. First and second connectors 135, 138 are terminated onto either end of the cable segment 132. The second connector 138 is configured to connect to a mating connector 136 on the breakout enclosure 130, and the first connector 135 is configured to connect to a mating connector 152 of the remote radio head 150.

As shown in FIG. 5C, the jumper cable 137' has a switch 140 incorporated into the connector 135 thereof. Alternatively, the power supply switch 140 could be incorporated into the connector 138. As shown in FIG. 5D, in other embodiments, power jumper cables 137" may be provided in which the power supply switch 140 may be incorporated as a sealed unit that is located within the cable segment 132. In the embodiments of FIGS. 5C and 5D, the jumper cables 137', 137" may be used in place of the jumper cables 137 of FIG. 5B, and the power supply switches 140 illustrated in FIG. 5B would be omitted.

As shown in FIG. 5E, in yet another embodiment, the power supply switches 140 may be incorporated into a stand-alone inline device 180. The inline device 180 may be connected, for example, between the breakout enclosure 130 and the jumper cable 137 or between the jumper cable 137 of FIG. 5B (in which case the power supply switches 140 in the breakout enclosure 130 of FIG. 5B would be omitted) and the remote radio head 150. The inline device 180 includes a housing 182 and first and second connectors 184, 186 that are provided on either end thereof. The connector 186 may be configured to connect to one of the connectors of the conventional jumper cable 137 and the connector 184 may be configured to mate with a connector of the breakout enclosure 130 or the remote radio head 150. Power supply and ground conductors 190, 192 may be provided within the inline device 180, and a power supply switch 140 may be provided that selectively allows a power supply signal to pass through the inline device 180. The inline device 180 depicted in FIG. 5E may be used in either the embodiment of FIG. 5A or the embodiment of FIG. 5B, except that the switches 140 illustrated in FIGS. 5A and 5B would be omitted when the inline device 180 was used.

The jumper cables 131, 137, 137', 137" of FIGS. 5A-5E are described as being power jumper cables that each include a power supply and a return conductors, but which do not include other elements. However, it will be appreciated that these jumper cables may comprise, for example, hybrid power/fiber optic jumper cables that include both the power supply and return conductors along with one or more optical fibers.

Figure 6:
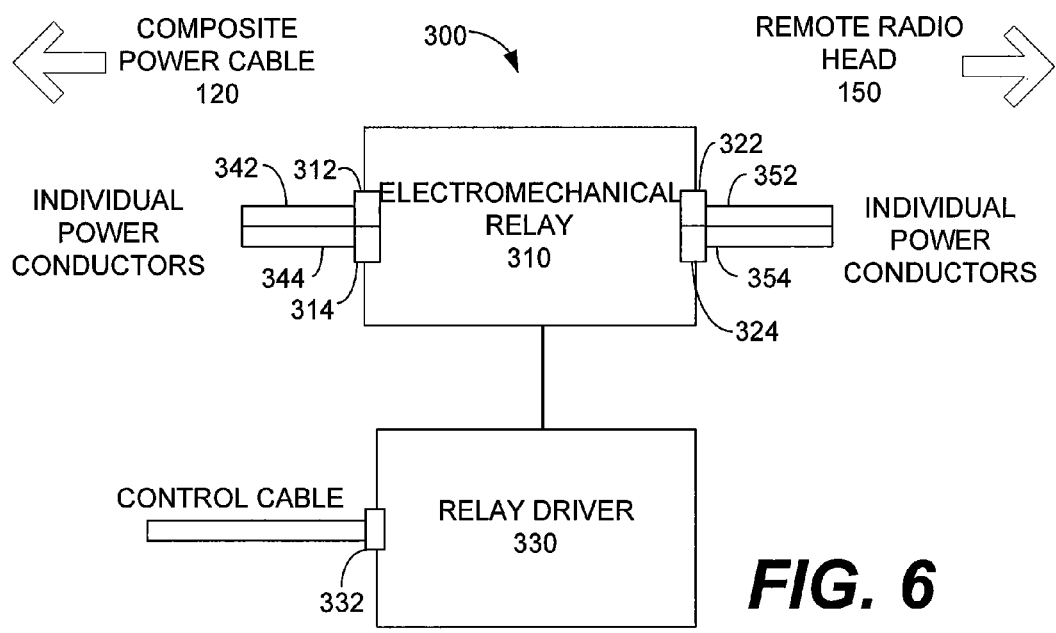
FIG. 6 is a schematic diagram illustrating the basic components of an example remotely controlled power supply switch according to embodiments of the present invention.

FIG. 6 is a schematic diagram illustrating the basic components of an example remotely controlled power supply switch 300 according to embodiments of the present invention. The power supply switch 300 of FIG. 6 may be used to implement the switches 140 and 240 described above.

As shown in FIG. 6, the remotely controlled power supply switch 300 includes an electromechanical relay 310 and a relay driver 330. An individual power supply conductor 342 that is electrically connected to the trunk power supply conductor 122 of the composite power cable 120 is received at a first input port 312 of the relay 310, and an individual return conductor 344 that is electrically connected to the trunk return conductor 124 of the composite power cable 120 is received at a second input port 314 of the relay 310. An individual power supply conductor 352 is electrically connected to a first output port 322 of the relay 310 and an individual return conductor 354 is electrically connected to a second output port 324 of the relay 310. The power supply and return conductors 352, 354 may be directly or indirectly connected to a power input port of a remote radio head 150.

The relay driver 330 may include an input port 332 that receives a control cable. In other embodiments, the input port 332 may be replaced with an antenna and receiver for receiving a wireless control signal (not shown). While not shown in FIG. 6, the relay driver 330 may also include an output port in some embodiments that may be electrically connected to the input port 332. This output port may be used to connect a plurality of the switches 300 in series to a single control line.

The relay driver 330 may include internal circuitry that generates a control signal that causes a pair of mechanical elements in the relay 310 (not shown) to, for example, switch between respective first and second positions. In the first position, the power supply conductor 342 may be electrically connected to the power supply conductor 352, and the return conductor 344 may be electrically connected to the return conductor 354. In the second position, the power supply conductor 342 may be electrically isolated from the power supply conductor 352, and/or the return conductor 344 may be electrically isolated from the return conductor 354. Thus, the switch 300 may selectively connect the power supply conductor 342 and the return conductor 344 to the power supply conductor 352 and the return conductor 354, respectively, in response to a control signal received at the input port 332 (or antenna) on the relay driver 330. The power supply switch 300 may be powered by the power signal carried on the individual power conductors 342, 344.

As discussed above, in some embodiments the control signal may be transmitted over the conductors of the composite trunk power cable 120. In such embodiments, the electromechanical relay 310 and the relay driver 330 may be more fully integrated so that the relay driver 330 may receive the control signal from the composite trunk power cable 120 instead of receiving the control signal from a separate control cable or from a wireless connection.

Power supply switches that are suitable for implementing the power supply switches 140 are commercially available.

Figure 7A:
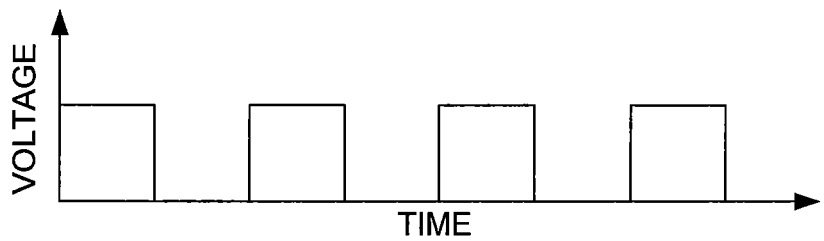
FIGS. 7A-7C are graphs illustrating example control signals that may be used to control the power supply switches according to embodiments of the present invention.
Figure 7B:
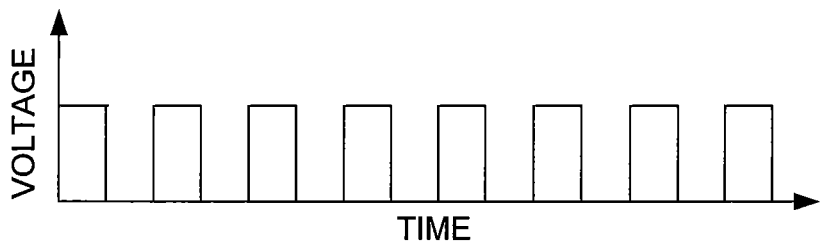
Figure 7C:
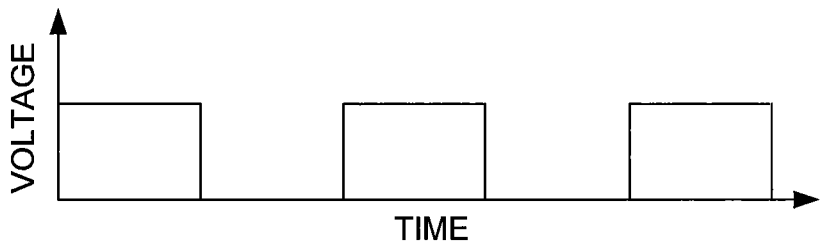

FIGS. 7A-7C are graphs illustrating example control signals that may be used to control the remotely controlled power supply switches according to embodiments of the present invention. As shown in FIG. 7A, a pulsed signal may be used as the control signal. In some embodiments, the power supply switch may be configured to toggle between the first and second positions that are discussed above with reference to FIG. 6 when an appropriate control signal is received at the relay driver. In other embodiments, the power supply switch may be configured so that a first control signal sets the power supply switch to the first position and a second control signal sets the power supply switch to the second position.

As shown in FIGS. 7A through 7C, in some cases a unique control signal (or pair of control signals) may be defined for each power supply switch used at the cellular base station. In the example of FIGS. 7A-7C, it is assumed that three remote radio heads 150 are provided that have associated power supply switches 140, and that each power supply switch 140 is programmed to toggle in response to a respective one of the control signals of FIGS. 7A-7C. Such a design may be used in cases where the control signals are carried on a common cable (e.g., either on the composite trunk power cable 120 or a shared control cable 114). In the embodiment illustrated in FIGS. 7A-7C, the control signals vary in terms of the frequency of the pulse. Such control signals may be used when the power supply switches comprise frequency modulated switches, and each power supply switch may be set to trigger in response to a control signal having a specific frequency.

It will be appreciated that a wide variety of control signals may be used to control the power supply switches, and the type of control signal used may be dependent upon the type of power switch selected. For example, the unique control signals used to control different switches may vary in terms of amplitude or phase instead of frequency. The control signals may be analog or digital. It will also be appreciated that switches other than electromechanical relays may be used.

Figure 8:
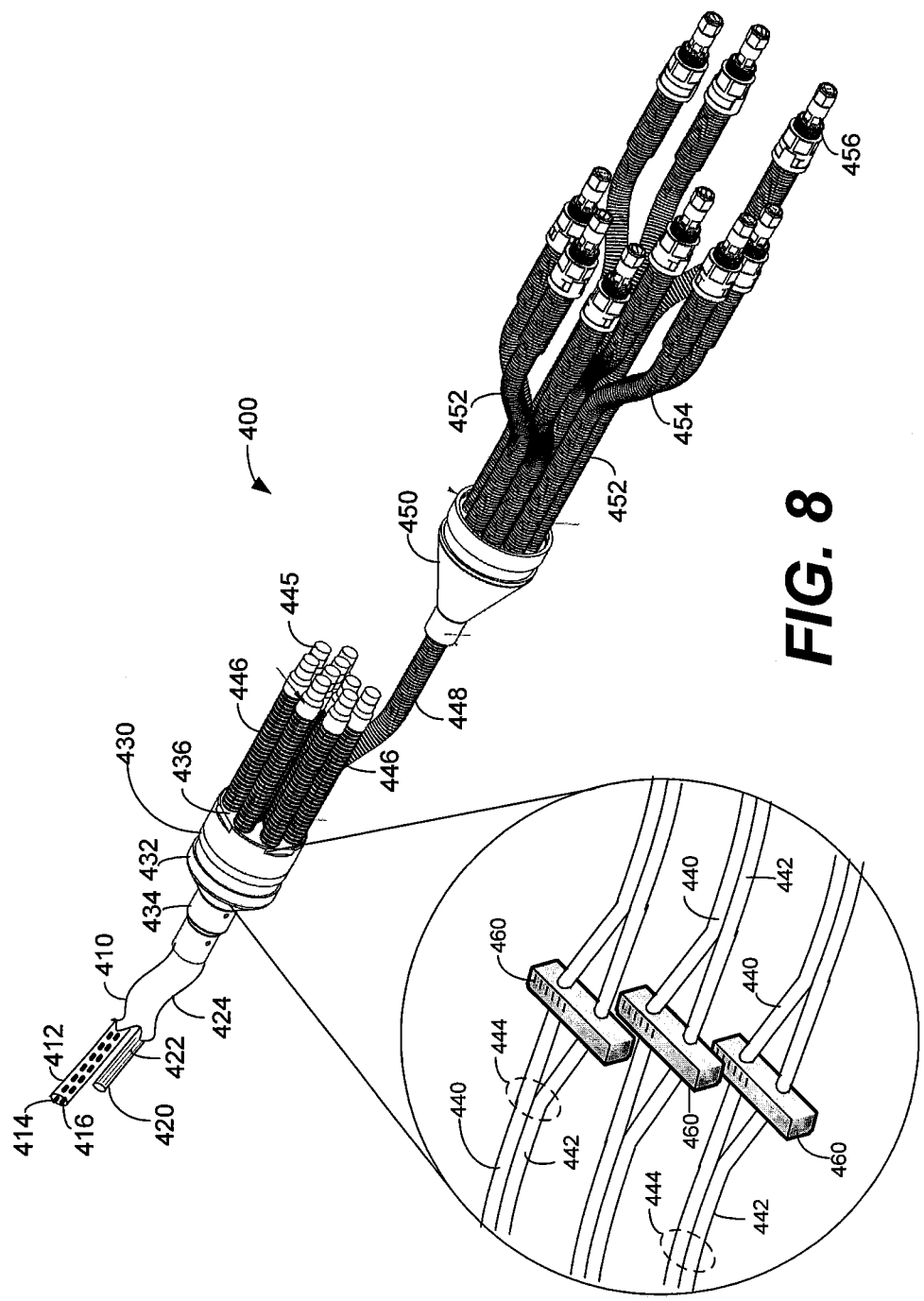
FIG. 8 is a schematic diagram of a hybrid power/fiber optic trunk cable according to embodiments of the present invention that has power supply switches integrated into a breakout enclosure thereof.

FIG. 8 is a schematic diagram of a trunk cable assembly 400 according to embodiments of the present invention that has power supply switches integrated into a breakout enclosure thereof. The trunk cable assembly 400 may be used, for example, in place of the power cable 220 and the fiber optic cable 260 of FIG. 3.

The trunk cable assembly 400 of FIG. 8 comprises a hybrid power/fiber optic trunk cable 410, a first breakout canister 430 and a second breakout canister 450. The hybrid power/fiber optic trunk cable 410 includes a power cable 412 that has a single trunk power supply conductor 414 and a single trunk return conductor 416. The hybrid power/fiber optic trunk cable 410 further includes a fiber optic cable 420 that includes thirty-six optical fibers 422. The fiber optic cable 420 may comprise a jacketed or unjacketed fiber optic cable of any appropriate conventional design. The composite power cable 412 and the fiber optic cable 420 may be enclosed in a jacket 424.

The first breakout canister 430 comprises a body 432 and a cover 436. The body 432 includes a hollow stem 434 at one end that receives the hybrid power/fiber optic trunk cable 410, and a cylindrical receptacle at the opposite end. The cover 436 is mounted on the cylindrical receptacle to form the first breakout canister 430 having an open interior. Nine individual power supply conductors 440 are electrically connected to the composite trunk power supply conductor 414 within the open interior of the first breakout canister 430. Likewise, nine individual return conductors 442 are electrically connected to the composite trunk return conductor 416 within the open interior of the first breakout canister 430. The individual power supply and return conductors 440, 442 are grouped in pairs to form individual power cables 444. Three of these individual power cables 444 are shown in the inset in FIG. 8. The nine individual power cables 444 are routed through respective sockets in the cover 436, where they are received within respective protective conduits 446 such as nylon conduits. Thus, each individual power cable 444 extends from the first breakout canister 430 within a respective protective conduit 446. A power connector 445 is mounted on the end of each individual power cable 444. It should be noted that the individual power cables 444 and conduits 446 will typically be longer than illustrated in FIG. 8 (e.g., 6-12 feet long) so that they may extend to the remote radio heads 150.

The optical fibers 422 are maintained as a single group and are routed through a specific socket on the cover 436, where they are inserted as a group into a conduit 448. Thus, the first breakout canister 430 is used to electrically connect the composite power cable 412 into a plurality of individual pigtail power cables that may be run to respective remote radio heads 150, while passing all of the optical fibers 422 via the conduit 448 to a separate breakout canister 450.

The optical fibers 422 pass through the first breakout canister 430 as a single unit in conduit 448 which connects to the second breakout canister 450. In the second breakout canister 450, the thirty-six optical fibers 422 are separated into nine optical fiber subgroups 452. The optical fiber subgroups 452 are each protected within a respective conduit 454. Each subgroup 452 is terminated with a fiber optic connector 456.

As is shown schematically in the inset of FIG. 8, a plurality of power supply switches 460 are provided within the first breakout canister 430. The power supply conductor 440 and the return conductor 442 of each individual power cable 444 are each cut into first and second segments, and the first and second segments of these power supply and return conductors 440, 442 are connected to a respective one of the power supply switches 460. In the embodiment of FIG. 8, the control signals that control the power supply switches 460 are transmitted on the composite power supply cable, and hence the power supply switches 460 do not include a separate control cable input port. As discussed above, each power supply switch 460 may selectively allow the power signal from the composite trunk power cable 412 to pass or not pass based on the control signals transmitted on the composite trunk power cable 412.

Figure 9:
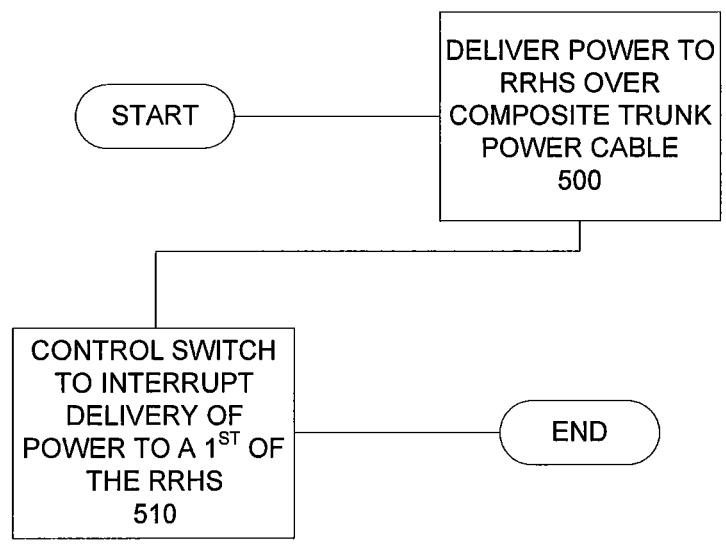
FIG. 9 is a flow chart of a method of powering a plurality of remote radio heads according to embodiments of the present invention.

FIG. 9 is a flow chart of a method of powering a plurality of remote radio heads according to embodiments of the present invention. As shown in FIG. 9, the method may involve delivering a power supply signal to a plurality of co-located remote radio heads using a composite trunk power cable that includes a single trunk power supply conductor and a single trunk return conductor and a plurality of jumper cables that electrically connect the single trunk power supply conductor and the single trunk return conductor to the respective remote radio heads (Block 500). A switch that is interposed on the electrical path between the trunk power supply and return conductors of the composite trunk power cable and a first of the remote radio heads may then be controlled from a remote location to interrupt delivery of the power supply signal to the first of the remote radio heads (Block 510).

In some embodiments of these methods, the composite trunk power cable may terminate into a breakout enclosure, and the switch may be located within the breakout enclosure. The breakout enclosure may further include an additional plurality of switches that are interposed between the trunk power supply and return conductors of the composite trunk power cable and the respective remote radio heads other than the first of the remote radio heads. In some embodiments, the switch may be controlled via a control signal transmitted over the trunk power supply conductor. In other embodiments, the switch may be controlled via a control signal transmitted over a control cable. In still other embodiments, the switch may be controlled via a wireless control signal transmitted from a switch controller that is remote from the remote radio heads. In embodiments where the switch is not included in the breakout enclosure, the switch may, for example, be incorporated instead into a jumper cable that is connected to the first remote radio head or into an inline device that is positioned between the breakout enclosure and the first remote radio head.

The power cabling connections according to embodiments of the present invention may provide a number of advantages over conventional power cabling connections. For example, as noted above, by supplying the power supply current to a plurality of remote radio heads over a single pair of conductors, the composite trunk power cables disclosed herein may take advantage of the fact that not all of the remote radio heads will operate under maximum load conditions at any given time. As such, the composite trunk power cables according to embodiments of the present invention perform load sharing which allows the cables to include less copper (which decreases the cost of the cable and the weight loading on the antenna tower) and/or operate with reduced voltage drops and power losses.

The present invention has been described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. Like numbers refer to like elements throughout the specification and drawings. It will also be appreciated that the embodiments disclosed above can be combined in any way and/or combination to provide many additional embodiments.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A power cabling connection for supplying power from a power supply to a plurality of remote radio heads, comprising:
a trunk power cable having a trunk power supply conductor and a trunk return conductor that are enclosed within a cable jacket and electrically insulated from each other;
a plurality of remotely-controlled switches interposed between the trunk power cable and the respective remote radio heads that are configured to selectively electrically connect the trunk power supply conductor and the trunk return conductor to a respective one of the radio heads.

2. The power cabling connection of claim 1, wherein an end of the trunk power cable that is remote from the power supply terminates into a breakout enclosure and the switches are located within the breakout enclosure.

3. The power cabling connection of claim 1, further comprising a plurality of jumper cables, each of the jumper cables having a respective power supply conductor and a respective return conductor, wherein the switches are located in the respective power jumper cables.

4. The power cabling connection of claim 1, wherein the switches are included in respective inline devices that each include a pair of connectors.

5. The power cabling connection of claim 1, further comprising a switch controller that is configured to communicate with the switches via at least one of the trunk power supply conductor and the trunk return conductor.

6. The power cabling connection of claim 1, wherein the switches comprise frequency modulated switches that are controlled based on a frequency of a received control signal.

7. The power cabling connection of claim 1, further comprising a switch controller that is configured to communicate with the switches via a control cable that is separate from the trunk power supply conductor and the trunk return conductor.

8. The power cabling connection of claim 7, wherein the control cable is within the cable jacket of the composite power cable.

9. The power cabling connection of claim 1, wherein the switches are controlled via wireless control signals.

10. The power cabling connection of claim 1, wherein the trunk power cable terminates into a breakout enclosure that includes a plurality of connectorized pigtails.

11. The power cabling connection of claim 1, wherein the switches comprise electromechanical relays.

12. The power cabling connection of claim 1, in combination with the power supply, the remote radio heads and at least one baseband unit that is in communication with the remote radio heads.

13. A method of delivering power, the method comprising:
delivering a power supply signal to a plurality of co-located remote radio heads using a composite trunk power cable that includes a single trunk power supply conductor and a single trunk return conductor and a plurality of jumper cables that electrically connect the single trunk power supply conductor and the single trunk return conductor to the respective remote radio heads;
controlling a switch that is interposed on the electrical path between the trunk power supply and return conductors of the composite trunk power cable and a first of the remote radio heads to interrupt delivery of the power supply signal to the first of the remote radio heads.

14. The method of claim 13, wherein the composite trunk power cable terminates into a breakout enclosure, and the switch is located within the breakout enclosure.

15. The method of claim 14, wherein the breakout enclosure includes an additional plurality of switches that are interposed between the trunk power supply and return conductors of the composite trunk power cable and the respective remote radio heads other than the first of the remote radio heads.

16. The method of claim 13, wherein the switch is controlled via a control signal transmitted over the trunk power supply conductor.

17. The method of claim 13, wherein the switch is controlled via a control signal transmitted over a control cable.

18. The method of claim 13, wherein the switch is incorporated into a jumper cable that is connected to the first remote radio head.

19. The method of claim 13, wherein the composite power supply terminates into a breakout enclosure, and wherein the switch is incorporated into an inline device that is positioned between the breakout enclosure and the first remote radio head.

20. The method of claim 13, wherein the switch is controlled via a wireless control signal transmitted from a switch controller that is remote from the remote radio heads.

* * * * *